United States Patent [19]

McGill et al.

[11] Patent Number: 4,837,739

[45] Date of Patent: Jun. 6, 1989

[54] TELEMETRY DATA PROCESSOR

[75] Inventors: David C. McGill, Houston; Gary J. McIntire, Friendswood; Mitchell T. Stowe, League City, all of Tex.

[73] Assignee: Ford Aerospace & Communications Corporation, Detroit, Mich.

[21] Appl. No.: 890,668

[22] Filed: Jul. 25, 1986

[51] Int. Cl.[4] .................... G06F 15/16; G06F 15/20
[52] U.S. Cl. ........................... 364/900; 371/8; 370/85; 340/825.05
[58] Field of Search ... 364/200 MS File, 900 MS File; 371/8; 340/825.05, 825.5; 370/85, 86, 89, 94

[56] References Cited

U.S. PATENT DOCUMENTS

| | | | |
|---|---|---|---|
| 3,950,729 | 4/1976 | Fletcher et al. | 364/200 |
| 4,245,344 | 1/1981 | Richter | 371/49 |
| 4,247,892 | 1/1981 | Lawrence | 364/200 |
| 4,410,959 | 10/1983 | Tajima et al. | 364/900 |
| 4,412,281 | 10/1983 | Works | 364/200 |
| 4,417,334 | 11/1983 | Gunderson et al. | 364/200 |
| 4,434,463 | 2/1984 | Quinquis et al. | 364/200 |
| 4,486,826 | 12/1984 | Wolff et al. | 364/200 |
| 4,490,785 | 12/1984 | Strecker et al. | 364/200 |
| 4,513,371 | 4/1985 | Celio | 364/200 |
| 4,521,871 | 6/1985 | Galdun et al. | 364/900 |
| 4,539,637 | 9/1985 | DeBruler | 364/200 |
| 4,564,900 | 1/1986 | Smitt | 364/200 |
| 4,654,846 | 3/1987 | Goodwin et al. | 371/8 |

OTHER PUBLICATIONS

Malek, D. and McIntire, G., "The Marriage of Ada and an Adaptable Multiprocessor Architecture", Proceedings of the 3rd Annual National Conference on Ada Technology, Mar. 20–21, 1985, Fort Monmouth, N.J.
Stowe, M. T., "Modular System Design for Space Station Data Handling Requirements", Proceedings, R&D Productivity, New Challenges for the U.S. Space Program, University of Houston, Clear Lake, Sep. 10, 1985.

Primary Examiner—Gareth D. Shaw
Assistant Examiner—Joseph T. Fitzgerald
Attorney, Agent, or Firm—Edward J. Radlo; Keith L. Zerschling

[57] ABSTRACT

A telemetry data processor for processing extremely high bandwidth data such as that associated with telemetry from spacecraft. A demultiplexer (1) distributes the data onto several channels (CH1 through CHn), each comprising a (preferably split-cycle synchronous) processing bus (BUS1 through BUSn). Processing can occur on each of the n buses simultaneously. Several processor modules (P boards) are directly coupled to each processing bus, with each P board directly coupled to two buses. Several memory modules (M boards) are directly coupled to each processing bus, with each M board directly coupled to two buses. The functions and architectures of the P boards and M boards are described, along with those of D boards (disk controller modules) and I boards (modules for interfacing the telemetry data processor with its outside environment, which may comprise local area networks, peripherals, gateways, etc.).

1 Claim, 4 Drawing Sheets

FIG. 1  TELEMETRY DATA PROCESSOR

SPLIT-CYCLE SYNCHRONOUS BUS

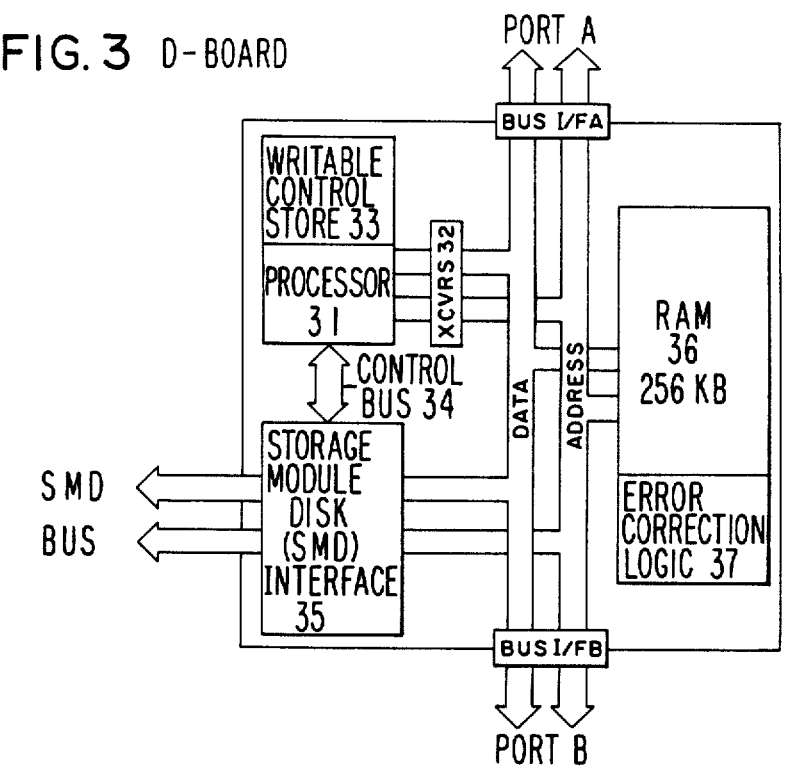
FIG. 3 D-BOARD
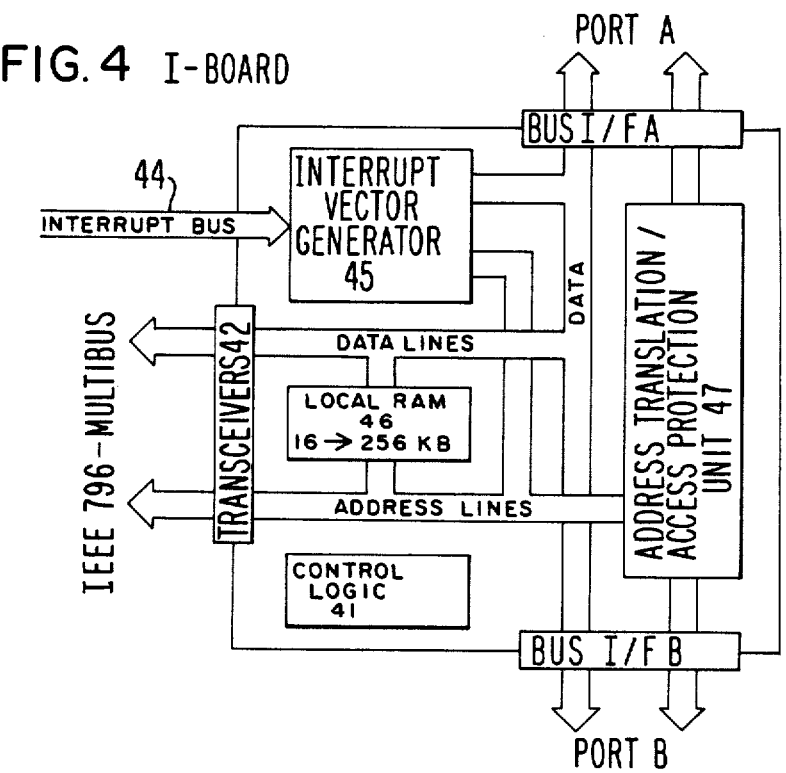
FIG. 4 I-BOARD

FIG. 5 P-BOARD
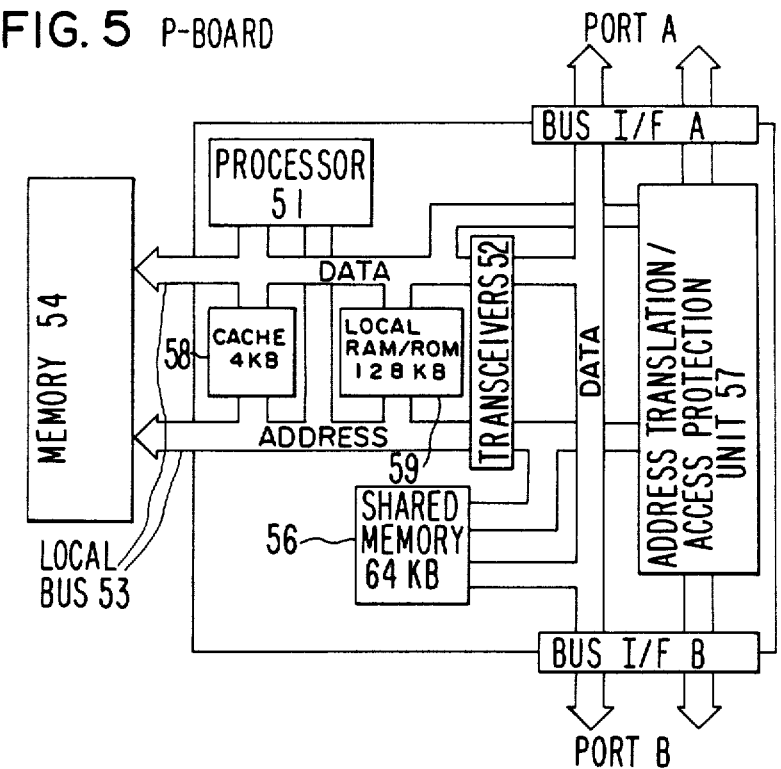
FIG. 6 M-BOARD
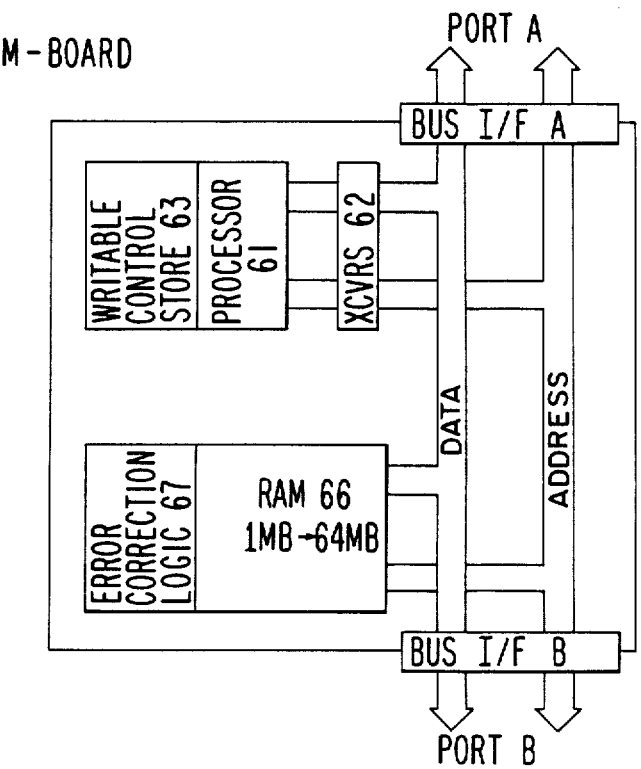

TELEMETRY DATA PROCESSOR

TECHNICAL FIELD

This invention pertains to the field of adaptable multi-processing computer architectures for processing extremely high bandwidth data streams.

BACKGROUND ART

U.S. Pat. No. 4,486,826 is representative of many prior art patents disclosing a fault tolerant computer system having two identical buses. The buses provide redundancy in case one of the buses should fail. The present invention uses several processing buses, not for reasons of safety (redundancy), but rather to increase performance so that commercial off-the-shelf (COTS) computers can be adapted to process high speed telemetry.

Stowe, M. T., "Modular System Design for Space Station Data Handling Requirements", *Proceedings, R&D Productivity: New Challenges for the U.S. Space Program*, University of Houston, Clear Lake, Sept. 10, 1985, describes in general terms the modular architecture used in the present invention, and, in FIG. 7, gives an overview of the present invention.

Malek, D. and McIntire, G., "The Marriage of Ada and an Adaptable Multiprocessor Architecture", *Proceedings of the 3rd Annual National Conference on Ada Technology*, Mar. 20-21, 1985, Fort Monmouth, N.J., discusses use of the Ada programming language with modular computer architecture components as used in the present invention; and gives a general description of the split cycle synchronous bus, P board, M board, D board, and I board of the present invention.

DISCLOSURE OF INVENTION

The present invention is a data processor designed to process high bandwidth (high data rate) data, e.g., that from a spacecraft telemetry channel. The invention overcomes problems of the prior art, where bandwidth, processing power, memory, or some combination thereof was inadequate to handle extremely high rate data streams.

In the cylindrical architecture of the present invention, means such as multiplexer/demultiplexer (1) distributes the input data onto several processing buses (BUS1 through BUSn). Several processor modules (designated by the letter P) are directly coupled to each bus, with each P module coupled to two buses. Several memory modules (M) are directly coupled to each bus, with each M module directly coupled to two buses. Each individual module is in relatively direct communication with each other module that is directly coupled to a bus to which said individual module is directly coupled. Each individual module is in relatively indirect communication with each module that is directly coupled to a bus to which said individual module is not directly coupled.

BRIEF DESCRIPTION OF THE DRAWINGS

These and other more detailed and specific objects and features of the present invention are more fully disclosed in the following specification, reference being had to the accompanying drawings, all of which pertain to the present invention, in which:

FIG. 3 is a functional block diagram of a D board;
FIG. 4 is a functional block diagram of an I board;
FIG. 5 is a functional block diagram of a P board;
and
FIG. 6 is a functional block diagram of an M board.

BEST MODE FOR CARRYING OUT THE INVENTION

Figure 1:
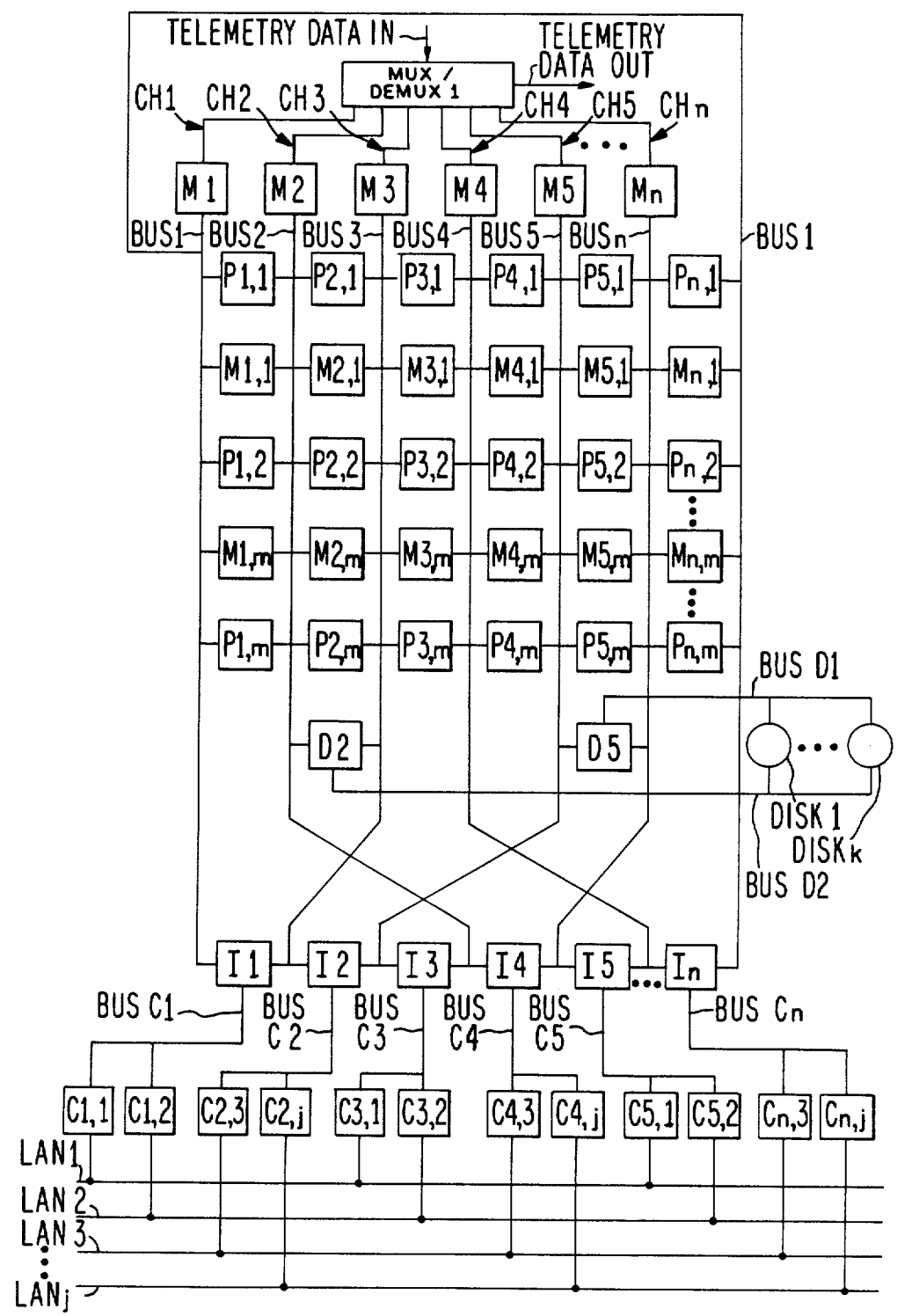
FIG. 1 is a functional block diagram.

In FIG. 1, the telemetry input data is digital data which can be split up; for example, data corresponding to different aspects of a manned orbiting space station to be launched by NASA (National Aeronautics and Space Administration) in the 1990's. The data has an extremely high rate, i.e., 150 megabits per second (MBPS). Existing computer systems which attempt to process such data normally run out of bandwidth, processing power, or memory; or some combination of bandwidth, processing power, and memory. The present invention allows n-simultaneity in processing this data, where n is any positive integer, using n processing buses and a highly modular architecture featuring fungible components (M boards, P boards, D boards, I boards) each having two identical ports for direct coupling to two of the n processing buses.

A demultiplexer 1 distributes the input data onto n channels (CH1 through CHn), according to channel information encoded onto the input data stream. In the embodiment illustrated in FIG. 1, there are six channels, each able to handle 50 MBPS continuously and simultaneously. Each channel comprises a processing bus, preferably a split cycle synchronous bus as described herein. The processing buses are designated BUS1 through BUSn. A memory module (M1 through Mn) acts as a high speed buffer between demux 1 and the processing bus of each channel. All blocks in FIG. 1 having a label starting with an M are identical M boards as illustrated in FIG. 6. All blocks having a label starting with a P are identical P boards as illustrated in FIG. 5. All blocks having a label starting with an I are identical I boards as illustrated in FIG. 4. All blocks having a label starting with a D are identical D boards as illustrated in FIG. 3. All blocks having a label starting with a C are commercial off-the-shelf (COTS) boards.

The architecture depicted in FIG. 1 is cylindrical. Thus, BUS1 on the left of the drawing is the same as BUS1 on the right of the drawing, and the line at the top of the drawing connecting the two serves to illustrate this identity. BUSr is defined as being "adjacent" to BUS(r+1) and to BUS(r−1), where r is any positive integer from 2 through n−1. In addition, BUSn is defined as being adjacent to BUS1.

Up to 15 of any combination of boards (P, M, I, and/or D) are directly coupled to each processing bus. Each P board is directly coupled to two processing buses (two adjacent buses in the FIG. 1 embodiment). Each M board is directly coupled to two processing buses (two adjacent buses in the FIG. 1 embodiment).

Each processing bus is preferably a split cycle synchronous bus, as defined below in conjunction with FIG. 2. Differing processing buses can have differing numbers of boards coupled thereto.

Each board (P, M, D, or I) is in direct communication (tight coupling) with all of the other boards (P, M, D, or I) that are directly coupled to the two processing buses to which said first board is directly coupled. The set of such boards comprises a "processing center" from the point of view of said first board. Intra-processing center communication is very efficient: the requesting board places onto one of the two local processing buses the address of one of the other boards in that processing center. The addressed board recognizes its address, and acknowledges and attempts to fulfill the request.

A somewhat less efficient form of communication link (loose coupling) exists between each board (P, M, D, or I) and those boards not directly coupled to the two processing buses to which said first board is directly coupled, i.e., those boards outside the processing center of the first board. In order for such inter-processing center communication to take place, an intermediate board or boards (M boards, P boards, or a mixture thereof) must be used. In this case, boards which are expected to be needed as intermediate boards are preprogrammed to respond to forwarding addresses not their own. The originating board does not have to know the identities of the intermediate boards, just the address of the ultimate addressee board.

The operating system (software and/or firmware) is distributed amongst all the P boards. In a simplified subset of FIG. 1 which has been built and successfully tested, the UNIX operating system was used.

A multiplexer is associated with demultiplexer 1 so that the communications with the space station or other object providing the telemetry can be two-way.

One or more identical disk controller modules (D boards) may be present in the telemetry data processor. Each D board is directly coupled to two processing buses (two adjacent buses in the FIG. 1 embodiment). Each D board is also coupled to one or more data storage disk drives via a data bus (BUS D1, BUS D2), which can be a standard bus such as the SMD (storage module disk) bus. Each SMD bus can couple up to sixteen disks (DISKI through DISKk). In the configuration shown in FIG. 1, BUS D1 and BUS D2 are redundant, and the total disk storage capacity is 8000 megabytes.

A number of identical I boards equal to the number of processing buses interfaces the telemetry data processor to its outside environment. In FIG. 1, each I board is coupled to two non-adjacent processing buses, rather than to two adjacent processing buses, so that each P board can have the ability to communicate directly with four I boards rather than with three I boards.

On the outside environment side of each I board interface is an application bus (BUS C1 through BUS Cn), e.g., an industry standard bus such as the IEEE Multibus, the bandwidth of which is typically 30 megabits per second. Ten or fifteen C boards could be coupled to each Multibus. The C boards do not have to be intelligent, although they typically return a status to the telemetry data processor signalling that the requested task has been completed.

The outside environment can include networks, gateways, peripherals, etc. In the FIG. 1 example, the outside environment comprises j local area networks (LANs), where j is any positive integer. To each LAN can be coupled several intelligent or unintelligent devices, such as graphics displays and artificially intelligent computers. Each I board couples to two LANs via one application bus and two C boards.

A dual redundancy configuration of LANs is illustrated in FIG. 1, in which each P board can communicate directly with four I boards, but it takes only two I boards to communicate with all four illustrated LANs.

Figure 2:
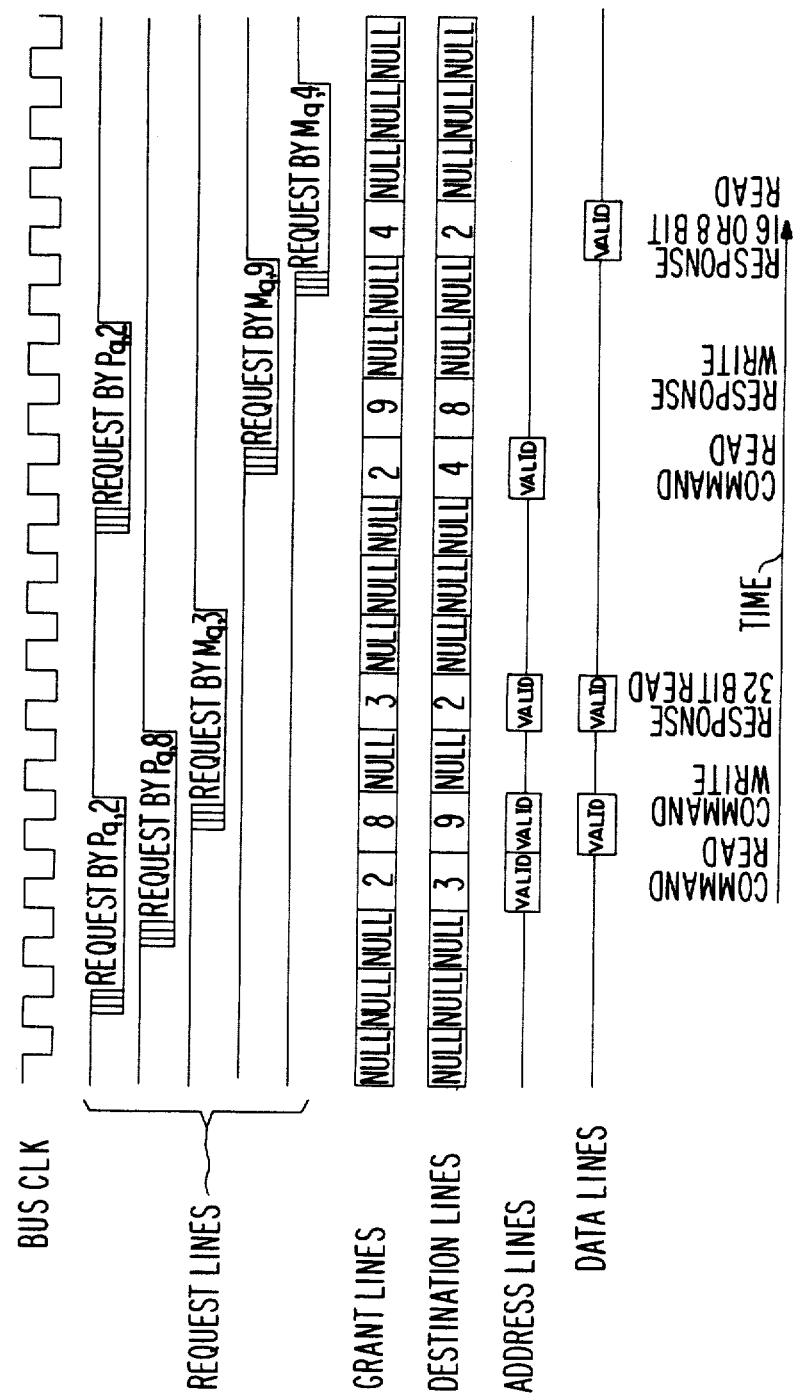
FIG. 2 is a timing diagram showing the operation of the preferred split cycle synchronous bus.

FIG. 2 illustrates the preferred embodiment of each processing bus: a split cycle synchronous bus. With common microprocessor buses, a requesting processor places the address on the address lines, holding the bus while the addressed memory board looks up the data then transmits that data back to the requesting processor. The requesting processor then relinquishes the bus, allowing another processor to use it. In the split cycle synchronous bus, on the other hand, the requesting board relinquishes the bus as soon as the bus has transmitted the address to the addressed board. After the addressed board has looked up and preprocessed the requested data, the addressed board momentarily acquires access to the bus in order to return the data to the requesting board. While this would be unnecessarily complicated for a bus having a single processor, its benefits become apparent in the multiprocessor case. For example, as shown in FIG. 2, after processor Pq,2 uses the bus to request data from memory Mq,3, and before Mq,3 returns the data to Pq,2, processor Pq,8 uses the bus to request data from memory Mq,9. (The subsequent request by Mq,3 is to return the data requested by Pq,2. Note that the address lines of the bus are not required for this operation.) Later Pq,2 requests data from Mq,4; and before Mq,4 seizes the bus to return this data, Mq,9 seizes the bus to return the data previously requested by Pq,8. The split cycle feature decouples bus bandwidth from memory access delays, and allows effective exploitation of concurrency among M boards, thereby allowing two M boards to appear to have twice the memory bandwidth of one board.

Thus, the split-cycle bus is a time multiplexed synchronous bus consisting of several lines (wires), some of which are illustrated in FIG. 2. These and other lines are used as follows:

Address lines (A0–A15)/Data lines (D0–D15):

Provide the address during a command (request) cycle; provide the data during a response cycle (32 bit data reads only). Because D0–D15 are multiplexed with A0–A15, a full 32 bit data path is available only for reads.

Address lines (A16–A25):

Upper 10 address lines. Total addressing range (A0–A25) is 64 megabytes of data for each board accessed.

Data lines (D16–D31):

Upper 16 data lines. Used for 8, 16, and 32 bit data transfers.

Destination lines (DEST0–DEST3):

Carry destination ID. Destination ID enables a unique board on the bus to receive the command or response.

Grant lines (GRANT0-3):

Give board access to the bus when grant signature equals board ID. Grant lines originate from a bus arbitrator located at one end of each bus.

Bus Request (BUS REQ):

Signal sent to bus arbitrator when a board requests access to the bus. Access is granted via the grant lines. Each module on the bus has a separate request line to the arbitrator.

Board ID (BRDID0-3):

Board identification (0–14) hardwire to the board's backplane. Each board on the bus has a unique board ID. ID 15 is reserved for a null device.

Read-Write (R/W), ECC (EER/):

Multiplexed line that indicates if current bus cycle is a read or write during a command cycle, and error correction status during a response cycle.

Board Reset (BRDRST/):

Board reset.

Bus Clock (BUSCLK):

Clock used to synchronize all bus operations. BUSCLK is a variable; it may be slowed to accommodate long bus runs.

Enable Drivers (ENDRV/):

Used to enable differential drivers to extend bus length. Derived from grant decode.

AC Power Loss (ACLOW/):

Input line from bus arbitrator, warning of impending power loss.

Response/Command (R/C):

Indicates if current bus cycle is either a response or a command.

Transfer Size (SC0—SC1) and Size Acknowledge (ACK0/-ACK1/):

Transfer size indicates the number of bytes of an operand remaining to be transferred during a given bus cycle; it is active during a command cycle. Size acknowledge indicates the port size of the device (8-, 16-, or 32-bits); it is active during a response cycle. These lines are used to implement dynamic bus sizing, compatible with the Motorola MC68020 microprocessor when used as processor 51 on the P boards.

Supervisor/User (S/U)/Access Error (AER/):

Supervisor/User controls access to supervisor (operating system) or user portions of memory. Attempts by a user routine to access supervisor space will cause an access error. S/U is active during a command cycle; AER is active during a response.

The request lines and grant lines are used in the arbitration scheme. To insure that all P, M, D, and I boards have equal access to the bus, and to also insure that no usable bus cycles are wasted, a "last grant, lowest priority" arbitration scheme is used. A PROM in the bus arbitrator is programmed to allow fixed priorities; or any combination of fixed and last grant, lowest priority groups.

Future telemetry data storage and retrieval systems are expected to require an efficient means of storing and managing continuous serial data on a disk based system. Currently available disk storage systems are designed to interface with computer systems which are intended primarily for conventional operating system file management, and data base management tasks. The designs of these systems are generally input/output bound due to requirements for special features for data protection and ease of handling individual data files. Many of these features limit the data throughput and flexibility required for the instant high speed telemetry data storage and retrieval processing system.

The disk controller board (D board) illustrated in FIG. 3 can support continuous high performance serial data applications, such as those expected to be required for future NASA ground data handling systems.

The D board has been designed to interface with a wide range of available disk drives from several manufacturers, and to accommodate future disk drives having increased storage densities and data rates. The D board features an intelligent microcontroller architecture, flexibility to implement custom firmware for future unique job requirements, and flexibility to support disk drives with different track bit densities and data rates.

As with the P, M, and I boards, the D board accesses two processing buses, labeled port A and port B. In FIGS. 3-6, only the data and address lines are illustrated for these processing buses; however, for all these FIGS., this is an artistic convention; in fact, all the bus lines defined previously are present at each occurrence of port A and port B.

Interfaces A and B act as buffers for isolation and provide drive logic for the processing buses. Within the D board, transceivers 32 buffer the lines from the processing buses for use by processor 31, which is preferably an Advanced Micro Devices (AMD) 29116 microprocessor. Processor 31 controls such disk drive operations as formatting, read/write operations, and commands to move heads of the disk drives. Writable control store 33 is RAM used by processor 31 to contain alterable program code.

Each disk drive is coupled to the D board using Storage Module Disk (SMD) interface 35. Dual ported operation is possible. Interface 35 provides for control of up to 16 SMD-type disk drives via a standard SMD bus (four disk drives without expansion). Interface 35 consists of transceivers and buffers, and converts SMD bus serial data to parallel data used by RAM 36, which, in the working embodiment, has 256 Kilobytes of random access memory in 16-bit words. RAM 36 acts as a buffer for data from the disks, converting said data to randomly available form for quicker access by the requesting board. Error correction logic 37 associated with RAM 36 detects, and in some cases corrects, errors in said data. Control bus 34 acts as a communications link between processor 31 and SMD interface 35.

All data exchange and commands between a host P board and the disk drives is via a D board. The data transfer rate is from 5Mbit/sec. to 20Mbit/sec. Processor 31 contains the components necessary to execute commands from the host P board. Processor 31 has access to 56K words of working storage memory within RAM 36. This working storage memory and the remaining 200K of memory within RAM 36 have single error correction and double error detection (SECDED) per word. The host P board has access to RAM 36 via host bus interface port A or B. There is a maximum bandwidth of 1.66M (M=$2^{20}$) words per second between the host bus interface port A, B and RAM 36. All transfers of data take place using RAM 36.

The D board utilizes logical unit addresses to access physical devices. Any logical unit address (0–15) can be assigned to each physical device address (0–15).

The D board provides the capability to format a range of tracks on a single disk drive using a single command. This range may be as small as one track or as large as the whole disk, and may begin at any track. Once the command is initiated, no further intervention by the host P board is required. Each track is formatted as a number of records, each record containing up to five groups of different length sectors. Each group can contain up to 512 sectors of identical length. Each sector length can be from 64 words up to 32,768 words. The D board supports interleave and spiral skew of records. A Format Command issued by processor 31 contains enough flexibility to format most disk drives.

During formatting, processor 31 locates all media defects on a track, and formats around them or declares the track defective. A "defective track" is defined here as any track with false address marks, or more than two defects 64 bytes or less in length. A skip displacement method is used to mask defects other than false address marks. A record, called the media defect table, records all defective tracks on each disk drive. Each disk drive's media defect table is written in triplicate on track 0 of the disk drive. This table is available to the host P board when its Initialize Drive command is executed.

Processor 31 utilizes an Error Correction Code (ECC) polynomial that can detect and correct single burst errors of 11 bits or less in the data field of each sector, for a maximum sector size of 32K words. For burst errors of 11 bits or less in the I.D. field of each sector, ECC does detection but not correction. Processor 31 provides the capability to optionally correct data field errors. The correction procedure requires less than 16 ms to avoid more than one rotational delay. Data is not transferred to or from any sector with an I.D. ECC error. Processor 31 verifies that the sector I.D. matches the I.D. requested, for all data transfer operations.

The D board provides for data transfers from 0 to 56K words while automatically crossing all physical sector and track boundaries, providing continuous or multiple sector read/write capability.

During a write data operation, if the number of words remaining to be transferred is less than the length of the sector being written into, processor 31 pads the remaining portion of the sector with zeros.

Processor 31 supports two modes of disk access addressing. In the physical addressing mode, the location of the data to be transferred is specified by cylinder, head, and sector addresses. In the logical addressing mode, the location of the data to be transferred is specified by a 32 bit record address. Record addresses are numbered consecutively from the first data track to the last data track, skipping over defective tracks.

All command parameter information from the host P board is transferred to the D board in a Task Block. Status and error information is written in the Task Block by processor 31 as required. Multiple commands to be completed in sequence are linked using link fields in each Task Block.

Any single command, or the first command in a linked sequence, is initiated by writing one word specifying the location of the Task Block into RAM 36. Up to 16 command sources with 16 pending commands each are supported.

The D board provides the capability to suspend a command if the disk drive being accessed is busy. Such a command is put in a first-in-first-out queue in RAM 36. When the disk drive becomes available, the commands issued for that disk drive are executed in time sequence. Commands for other disk drives are executed while this disk drive is busy. Commands that require an initial disk drive access, a disk drive busy time, and possibly another disk drive access, are queued during the disk drive busy time. Commands in the queue have a higher priority than incoming commands.

The D board provides the capability to be configured to perform automatic error recovery schemes. The following automatic error recovery sequences are incorporated into processor 31: (1) automatic re-reads for uncorrectable data ECC errors or I.D. ECC errors with optional data strobe skew and head offset; (2) automatic performance of a re-seek when a seek occurs; and (3) automatic clear of a read/write fault error and re-initiation of the sequence.

The D board contains in writable control store 33 a library of tests that exercise the functions of the D board and the disk drives attached to it. These tests are initiated by a Task Block from the host P board, and results of these tests appear as status in the Task Block. Diagnostic tests are also run automatically after system reset and during idle times.

The design of the D board allows the development of special microcoded sequences to be implemented in writable control store 33 on an application-by-application basis. The existing microcode is in a modular structure and well documented, to reduce the effort required to implement special application microcode.

The D board automatically executes a built in (in a program store ROM associated with processor 31) diagnostic test to verify all internal data paths when system reset is received from the processing bus of the host P board. If an internal failure occurs, processor 31 generates a Controller Fault completion code after receiving its first Task Block (if possible). If the diagnostic completes successfully, the D board begins executing Task Blocks from the host P board.

If a power failure is imminent, the D board enters the Power Failure mode. In this mode, disk data integrity is preserved when power transients occur. The D board is in the Power Failure mode when system power is first applied. Processor 31 enters the Power Failure mode when it receives a power failure indication from the processing bus of the host P board, when onboard voltages are out of tolerance, or when it executes a system power down command. An internal reset occurs after exiting the Power Failure mode.

Turning to FIG. 4, each interface board (I board) couples the telemetry data processor to an industry standard bus (such as an IEEE 796, otherwise known as Multibus). This allows for many functions that are available commercially, such as local area network (LAN) controllers, terminal and printer interfaces, and mass storage devices, to be integrated into the telemetry data processor. The I board was designed to the full IEEE 796 standard, giving it compatibility with any of the commercially available Multibus boards.

FIG. 4 shows a high level block diagram of the I board. Ports A and B are again the two processing buses to which the I board is connected. Bus interfaces A and B have the same functions as with the D board. Transceivers 42 comprise buffers between the I board and the Multibus. Control logic 41 is coupled to all of the other components of the I board; the coupling lines are not shown to avoid cluttering FIG. 4. Control logic 41 determines when transceivers 42 and interfaces A and B are activated, and performs other control functions.

Two transfer modes are provided. In the first mode, data is passed between the Multibus and port A or B directly. This mode has the advantage of the requesting bus being able to access information from the accessed bus immediately. In the second mode, data is first transferred to local RAM 46 on the I board. It is then passed to the requesting bus from local RAM 46. This allows the Multibus to operate at maximum data rates. It decouples the access time of the split-cycle bus (port A, B) from the Multibus cycle time. Both modes can be used simultaneously to meet the needs of the particular operation.

The I board also contains an address translation/access protection unit (ATU) 47, which has the same capabilities, described in more detail later, as the P board's ATU 57. The address translation portion of ATU 47 is useful because there are more addresses (64 Megabytes) on the telemetry data processor side of the I board than on the Multibus side, where there are typically 16 Megabytes. The access protection portion of ATU 47 provides fault protection for certain addresses.

Also included on the I board is an interrupt vector generator 45 to convert the Multibus interrupt scheme, as communicated by interrupt bus 44, into the telemetry data processor's interrupt scheme.

The Multibus was chosen as the peripheral bus because of its popularity in the industry and the vast availability of plug-in boards. The I board can be simply and easily modified to accommodate the VME bus, which is also an industry standard bus. To facilitate the use of peripheral controllers, memory-mapping and interrupt arbitration functions were built into the UNIX operating system kernel.

FIG. 5 shows that each P board has three ports available for routing addresses and data. Ports A and B are again the global processing buses. Bus interfaces A and B interface to these ports, respectively. The third port comprises an extension bus 53 local to that particular P board, and is used to couple to dedicated hardware, e.g., scratchpad memory 54. There can be up to 15 P boards coupled to each of port A and port B as presently configured. P boards coupled to each processing bus are numbered 0 through 14. Device 15 is non-existent and used to fill unused bus cycles.

The heart of the P board is processor 51, which preferably is a powerful multipurpose microprocessor such as a Motorola M68000, M68010, or M68020. 128 Kilobytes of dedicated memory are provided to processor 51 via local RAM/ROM 59. Transceivers 52 buffer the processing bus lines that enter processor 51. The access protection portion of ATU 57 creates a type of partitioning which protects global memory from the individual processor 51. The address translation portion of ATU 57 translates global addresses to those usable by processor 51. Untranslated physical addresses below 512K are considered local to the P board, and a small portion can be accessed only through two windows. The first window, 192K through 256K, is referred to as shared memory 56. Memory 56 is shared in the sense that it appears in the local address space of the associated processor 51 as well as in the system space of the associated port A, B. Shared memory 56 is used for communication of data packets to and from a P board not coupled to the same processing bus. The second space, 288K through 512K, is memory 54 and is available through the board's local bus extension port 53.

The M boards are currently configured such that the first 4K block within RAM 66 is used as the shared memory for processor 61. The remainder of RAM 66 is global memory.

Physical memory is accessed in the form of logical pages. There are 1024 pages with a size of 4K bytes available to processor 51 at any one time. These pages can be mapped anywhere in physical memory, but there is only a 4M logical address space in a 64M physical address space. This logical space is addressed from 4M through 8M.

The addresses coming out of processor 51 are in the format of logical page, word offset, and word interleave. A Translation Function Code (TFC) must be 01 for address translation to occur. If it is 00, bits 18 through 1 make up a 512K local P board address. Address Translation Unit (ATU) 57 implements the address translation. It contains 2048 translation registers, each of which is a 4 element vector of interleave descriptors. Bits 15 through 3 of an interleave descriptor make up bits 24 through 12 of the physical address.

Memory interleaving is a technique used to minimize data path and memory device contention. This is usually done by having even addressed words on one M board and odd addressed words on another; this is called two-way interleave. In our case, four-way interleave is possible. Typically, this is done by the hardware and is transparent to the software. In our telemetry data processor, the operating system is responsible for setting up the desired interleave scheme. Each logical page can be interleaved up to four ways.

Each P board contains a cache memory 58 used by processor 51 to increase speed in executing programs where data is read more than once, e.g., programs with loops. Cache 58 can be cleared by writing to its cache reset tag. Cache 58 is a "write-through" type, meaning that in addition to being cached, write accesses by the associated processor 51 also update main memory 66.

Cache 58 must be cleared whenever the physical address for a virtual address gets changed, or whenever data in memory 66 is updated from another P board. It is never wrong to clear cache 58 without changing the memory mapping or data contents, but if this is done too often, the benefits of using cache 58 are lost. Whether or not data is cached can also be controlled by the operating system via a "no cache" bit in the interleave descriptor.

Each M board provides both memory and building block capabilities, and is compatible with all other boards. To be consistent with the capabilities and requirements of the telemetry data processor, that is, extensible and expandable, the M board is dual ported, intelligent, and can operate autonomously. The M board provides slave memory to P boards and I boards; and runs independently, executing low-level tasks, relieving the P and I boards of burdensome overhead.

The M board is an intelligent module which contains its own processor 61 and up to 64 Megabytes of error corrected RAM 66. RAM 66 and microprocessor 61 communicate to ports A, B through dual bus interfaces A, B, respectively. Transceivers 62 buffer the processing bus lines to processor 61. Processor 61 is preferably a 16-bit AMD 29116 bit-slice microprocessor. We use it for low level processing and memory management, such as block memory transfers and high speed dumps. Processor 61 comprises the AMD 29116, an AMD 2910 microprogram sequencer, and memory for microcode storage. The control portion of the microcode is stored in writable control store RAM 63. Microcode stored in EPROM is loaded during the initial program load (IPL) and can be changed "on the fly" during program execution. Since these elements are external to the AMD 29116, as opposed to a conventional microprocessor where the microcode is internal, custom microcode may be written with certain bit fields dedicated for operating various board functions. Selected bit fields may be used for enabling latches, clocking FIFOs, and providing inputs to PALs (programmable array logic chips); while certain bit fields must be reserved for the microprocessor and microcode sequencer instructions. The microcode word width may be increased, within limits, by adding additional RAM 63.

The AMD 29116 instruction word (16-bits), the 2910 microsequencer instruction and branch address (20-bits), the board control (13-bits), and 5 currently reserved bits comprise the 64 bit microcode word.

The AMD 29116 was selected because it is optimized for high-performance controllers, is effective in a microprogrammed environment, and has a high speed bit manipulation capability. It has a 16-bit data path, 6-bit barrel shifter, 32 working registers, a 125 ns microcycle time, and an 8 MHz data rate on all instructions.

Processor 61 has the ability to execute both a read and write during the same instruction cycle. The AMD 29116 makes this possible because an externally controllable data latch can hold data for the processor's ALU (arithmetic logic unit), releasing the data lines to accept a write as soon as the ALU is ready. This would not be possible with a conventional microprocessor, where control of the data latch is internal.

The M board performs memory functions, semaphore control necessary for shared resource allocation, and most inter-bus communication functions (channel routing). Other capabilities include string searching, DMA-like block transfers, and parameter decommutation. The AMD 29116 allows the M board to operate as a single board computer as well as a slave processor to the master P boards.

RAM 66 is a 32-bit wide array and can have either 1, 4, 16, or 64 Megabyte capacity, depending on the selection of dynamic RAM chips. Jumper selections configure the address lines for the RAM chips selected. The memory is organized into four banks of 8 bits, and is connected to a supporting RAM Address Mux and to a supporting RAM Control Circuit. In order for the RAM chip packages to have a small pin count (16, 18, or 20 pins) the address lines are multiplexed. The 1 Megabyte chip, for example, multiplexes its 20 address lines through 10 pins. A Row Address Strobe (/RAS) latches in the 10 row address bits and a Column Address Strobe (/CAS) latches in the 10 column address bits, with the RAM Address Mux handling the address line multiplexing. RAS and CAS timing, control of the RAM Address Mux, port request, grants and enables, and memory refresh are all coordinated by the RAM Control Circuit.

All input address, data, and control information from ports A, B is queued up in a bank of input FIFOs (integrated circuits in communication with processor 61), with a maximum of 16 pending commands queued in each FIFO bank. Whenever at least one command word is queued in a FIFO array, a request is issued to the RAM Control Circuit. With two FIFO arrays contending for RAM 66, an arbitrator in the RAM Control Circuit regulates the access each port A, B has to RAM 66. Once arbitration is complete, an output enable is issued to the selected FIFO array; and the command word (address, data, and control lines) is enabled onto internal buses. When the access is complete, the FIFO is clocked to bring the next command to the output latches of the FIFO. All four boards (P, M, I, D) have this circuit to access internal memory.

All responses back to a processing bus are first queued into response latches connected to processor 61. The RAM Control Circuit coordinates the loading of the response latches, ensuring first the validity of RAM 66 data.

In any multiprocessor system, there is a need to "lock" or manage access to certain areas of memory or certain areas of code. This is to prevent data from being garbled by multiple non-synchronized reads and writes, and to protect non-reentrant code. Using semaphores, or flags, to maintain the status of these areas is the most popular method of management. In the telemetry data processor, the M board is used as a secure method to implement and modify semaphores.

The semaphore system is organized around a table on the M board, with each entry providing a place for a command and parameter list. There is one entry for each possible board on both buses of an M board. The command is an instruction given to an M board by the accessing P board, telling the M board what operation is to be performed on the flag. Processor 61 of the M board will scan this table in search of active commands. When finding a semaphore access request, it will read or write the semaphore and return the results to the P board. In this manner mutually exclusive access by the P boards to the semaphores is maintained. The protocol of P boards is such that they may make only one command to an M board, and will wait for a response before another command is issued. The results of the operation will be returned to the P board in order that the P board may check the status of the flag. Each entry is uniquely associated to each P board by using the P board bus I.D. and bus designation (A or B).

Memory errors are detected and corrected by four 8-bit parallel error detection and correction (EDAC) circuits 67. During a memory write cycle, each EDAC circuit 67 generates a 5-bit Hamming Code which is written along with its associated 8-bit word. During the read cycle, each 13-bit words is by the EDAC circuits 67 to determine if any memory errors have occurred. Single bit errors are detected and corrected, while double bit errors can only be detected. Errors of three or more bits are beyond the capabilities of the EDAC circuits 67 to detect. If a non-correctable error is detected, an ECC error status code is returned during the response cycle of the processing bus. Single bit errors are logged in a memory status table within RAM 66 by processor 61. This information can be used to identify a faulty memory chip to be replaced during maintenance.

The M board can serve as an intermediary allowing data to be routed between P boards not directly coupled to the same processing bus. This feature is especially important during any type of multiprocessing, where multiple processors may share results among each other. Packets of information are routed between various buses, in much the same way a local area network gateway or bridge passes information from one network to another.

All boards (P, M, D, and I) could be applied in architectures other than that illustrated in FIG. 1. The dual port design allows pipelined, parallel, or complex architectures to be formed with the boards of the telemetry data processor. The two-dimensional expansion ability allowed by the dual port design gives flexibility to the system designer in configuring a system for a given application.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A data processor for high bandwidth data, said data processor having a cylindrical architecture and comprising:
   means for distributing the data onto n generally parallel buses where n is any preselected positive integer greater than 3;
   several processor modules directly coupled to each bus, with each processor module directly coupled to two adjacent buses, where bus(r) is defined as being "adjacent" to bus(r+1) and to bus(r−1), r being any positive integer from 2 through n−1, and, in addition, bus(n) is defined as being "adjacent" to bus(1); and several memory modules directly coupled to each bus, with each memory module directly coupled to two adjacent buses; wherein each individual module has a first, relatively direct, communications relationship with each other module that is directly coupled to a bus to which said individual module is directly coupled in view of the fact that communications between such modules occur over but a single intervening bus, and a second, relatively indirect, communications relationship with each other module that is directly coupled to a bus to which said individual module is not directly coupled in view of the fact that communications between any two such modules is routed via at least one additional intermediate module and two buses; and distinct buses can simultaneously be activated to communicate distinct packets of information between different modules wherein each bus comprises data lines and address lines, and each processor module comprises:

first and second ports for coupling to the two adjacent buses, respectively;

an address translation/access protection unit coupled to the address lines at each of said ports;

a microprocessor coupled to the address translation/access protection unit and to the data lines at each of said ports via a set of transceivers;

a first local memory coupled to the address translation/access protection unit and to the data lines at each of said ports;

a second local memory coupled directly to the microprocessor and coupled to the address translation/access protection unit via the set of transceivers; and a cache memory coupled directly to the microprocessor, coupled directly to the second local memory, and coupled to the address translation/access protection unit via the set of transceivers.

* * * * *